United States Patent [19]

Freimanis

[11] 3,851,108

[45] Nov. 26, 1974

[54] COMMUNICATION LINE SUPERVISORY CIRCUIT

[75] Inventor: Laimons Freimanis, Chicago, Ill.

[73] Assignee: Bell Laboratories, Incorporated, Murray Hill, N.J.

[22] Filed: Dec. 20, 1972

[21] Appl. No.: 316,915

[52] U.S. Cl. .......... 179/18 F, 179/170 G, 323/94 H

[51] Int. Cl. .......... H04m 3/22

[58] Field of Search .......... 179/18 F, 18 FA, 170 G; 323/94 H

[56] References Cited

UNITED STATES PATENTS

| | | | |
|---|---|---|---|
| 2,571,915 | 10/1951 | McCoubrey | 323/94 |
| 2,752,553 | 6/1956 | Dunlap | 323/94 |
| 2,870,261 | 1/1959 | Van Lottum | 179/18 |
| 3,042,816 | 7/1962 | Aagaard | 179/18 |
| 3,187,101 | 6/1965 | Broux et al. | 179/18 |
| 3,750,143 | 7/1973 | Osborn | 340/347 |

OTHER PUBLICATIONS

Modern Dictionary of Electronics By Rudolp F. Graf, Third Edition

*Primary Examiner*—Kathleen H. Claffy
*Assistant Examiner*—C. T. Bartz
*Attorney, Agent, or Firm*—W. H. Kamstra

[57] ABSTRACT

A communication line supervisory arrangement which employs the presence of direct off-hook loop current to generate in a line battery feed inductor a magnetic flux which controls the current level in a detection circuit. The inductor core is split to present an air gap within which a flux-responsive resistor (magnetoresistor) is positioned, the resistor being serially connected in the detection circuit to vary current therein as current in the communication line and hence the magnetic flux in the gap varies. The invention is advantageously applicable as a means for detecting an off-hook line condition (or dial contact break) or as a means for providing a precise compensation for loss due to line length.

4 Claims, 2 Drawing Figures

COMMUNICATION LINE SUPERVISORY CIRCUIT

BACKGROUND OF THE INVENTION

This invention relates to electrical signaling systems and more particularly to such systems in which signals requiring specific responding action originating at any one of a plurality of distant stations are detected at a central control station for appropriate response. Although not limited thereto, this invention is especially applicable to the supervision of telephone system subscriber lines and illustrative embodiments will be described hereinafter in that context.

As is known, in order to provide rapid response to signals generated at a telephone subscriber station, the central office must be constantly alert to the electrical state of the lines. Thus, normally, a subscriber line may signal that it is idle, is requesting service, is busy, and in the case of a dial subscriber station, the line may signal by means of digital pulses, a called directory number. These signals are generated by the familiar hookswitch and dial contacts each of which may control the electrical continuity of the line. As the result of an "off-hook" state of the line, for example, in which the line circuit is completed to a potential source, current is present which may subsequently be interrupted by an "on-hook" state or the operation (opening) of the dial contacts when the dialing of a called directory number is initiated. Central offices have in the past provided means for detecting the presence of current or its absence (or periodic absence) in a subscriber line and a number of such detection arrangements are known in the art. In one arrangement, for example, described in The Bell System Technical Journal, Vol. 43 September, 1964, at page 2,376, a ferrod sensor is scanned to determine the presence of direct supervisory current in a subscriber line. A ferrite magnetic core coupled to the line is saturated by the presence of supervisory current in the line with the result that an interrogate pulse applied to the core causes no appreciable flux change. No output current is induced as a result in an output winding also coupled to the core. Thus, with no current present in the line loop (on-hook or open circuit) an interrogate pulse produces a large pulse in the output winding, whereas the presence of direct current in the line loop (off-hook or closed circuit) suppresses the output pulse. A ferrod sensor associated with each subscriber line is scanned with sufficient frequency to detect the periodic make and break operation of subscriber actuated dial contacts.

In the prior art supervisory circuits it has been necessary to provide means for isolating the circuit from the speech path of the subscriber loop once the calling information has been received at the central office and the connection to the called party established. This for the most part is conventionally accomplished by a cutoff relay operated by the control equipment of the telephone system to prevent a shunt of the speech path by the supervisory circuit. Although prior art systems have coped with the cutoff function, it is clear that a supervisory detection circuit of a character which may remain electrically connected to a subscriber or other line circuit after establishment of the path would not only achieve substantial economies in circuit elements but would also simplify the control apparatus of the system.

A subscriber or other line supervisory arrangement could advantageously serve an additional function, either independently of, or in conjunction with, its function of detecting the open or closed state of a line. Once the central office control equipment has responded to a subscriber request for service, talking current remains in the subscriber line loop, the magnitude of which is related to the distance of the remote subscriber station from the central office. This manifestly may vary over a wide range with a resulting wide variation in current levels in individual lines. In the past, supervisory arrangements have been largely concerned with the presence of current of a particular magnitude in a line rather than with the manner in which it may vary among lines. A problem thus remains of providing circuit means for equalizing current levels in subscriber lines varying in distance from the central office or, at least, for compensating those lines subject to greatest loss.

This invention is thus directed to the general problem of achieving a versatile telephone subscriber or other line supervisory circuit arrangement which has relatively few circuit elements, is readily fabricated, and is capable of sensing current variations in a line.

SUMMARY OF THE INVENTION

The problems briefly considered in the foregoing are met in one illustrative embodiment of this invention comprising a known subscriber line circuit terminating at a subset including hookswitch and dial contacts which more generally may be considered a digital signal source, which circuit is extended to a central office where it is coupled to the transmission speech path by means of a transformer. Such a transformer is frequently employed in connection with telephone subscriber lines as a means for supplying talking current and it also provides the necessary longitudinal balance for canceling externally induced currents. The laminated core of the transformer is conventionally split to present an air gap to prevent saturation as the result of the relatively high direct currents present in short line loops. The familiar "E-I" transformer core is an example. The amount of flux present in the air gap of such a transformer on an "off-hook" line condition, for example, is directly proportional to the current present in the line and is not affected by longitudinally induced currents.

In accordance with the principles of this invention, a flux responsive resistive element is inserted in the air gap of the transformer, which resistive element controls a current value in a detecting circuit. Thus, as the subscriber line goes "off-hook" and the line loop is closed, an increase in flux density in the air gap increases the resistance serially present in the detecting circuit. A resistive element contemplated to carry out this invention may comprise, for example, a magnetoresistor of the character described in an article appearing at page 36 et seq. in EDN/EEE, Vol. 17, No. 2, Jan. 15, 1972. In one specific embodiment of the invention, the current in the detecting circuit is employed to energize a threshold means, the output of which is indicative of the presence of sufficient current in the subscriber line loop for a positive identification of an "off-hook" line condition or other closed circuit state. The flexibility of a supervisory arrangement according to this invention is demonstrated in another embodiment in which the resistance presented by the magnetoresistor again controls current in the detecting circuit but, in this case, on an analog basis. An output of the detecting circuit is directly related to the length of the subscriber line loop and is employed to control circuitry for compensating for the variations in line loop lengths.

BRIEF DESCRIPTION OF THE DRAWING

The organization and operation of a subscriber line supervisory arrangement in accordance with this invention will be better understood from a consideration of the detailed description of specific illustrative embodiments thereof which follows when taken in conjunction with the accompanying drawing in which.

DETAILED DESCRIPTION

Figure 1:
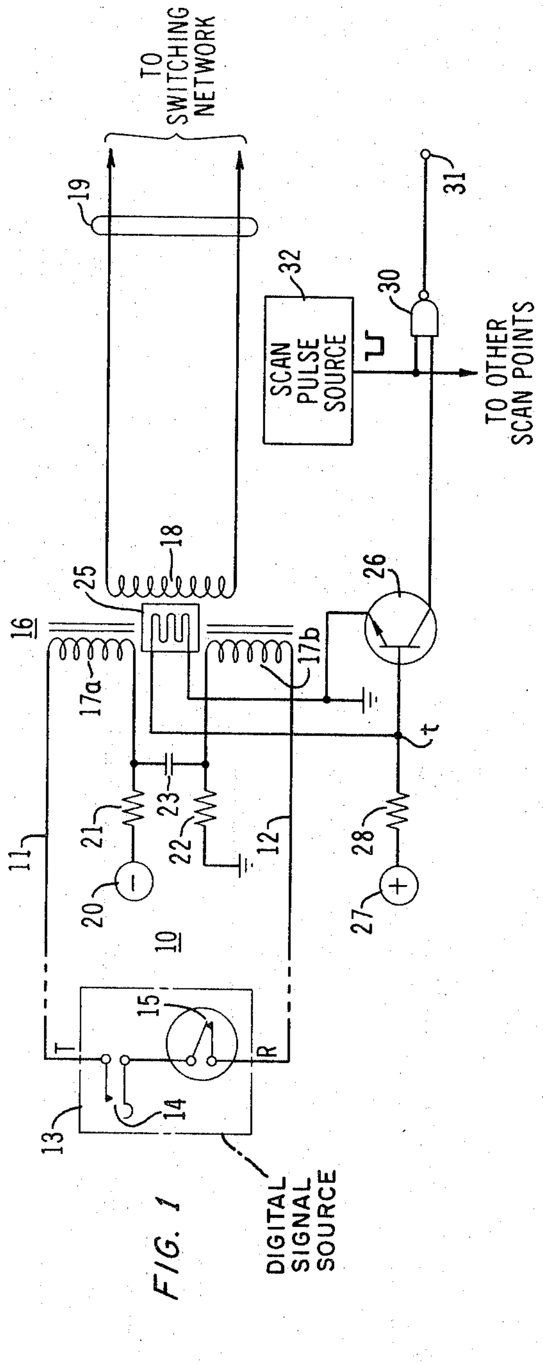
FIG. 1 depicts schematically one specific illustrative supervisory circuit according to this invention adapted to provide a digital indication of the operative state of a telephone or other communications line.

An illustrative supervisory arrangement according to this invention is shown in FIG. 1 as associated with a typical telephone subscriber line circuit 10 comprising a tip and ring conductor 11 and 12, respectively, terminating at one end at a remote subscriber station 13 including normally open hookswitch contacts 14 and normally closed dial contacts 15 which subscriber station 13 may be generally considered a digital signal source. The station 13 conventionally includes other components such as a ringer, receiver, transmitter, etc., however, since this invention is primarily concerned with the direct current line loop, these components have been omitted for the sake of simplicity and may be readily envisioned by one skilled in the art. The tip and ring conductors 11 and 12, extended to the central office, are terminated in a transformer 16 having a split primary winding 17*a* and 17*b* and a secondary winding 18, which transformer couples the line circuit 10 to the speech path 19 and thence to the system switching network. Tip conductor 11 is connected to a source of negative potential 20 via winding 17*a* and a resistor 21. The preparation of a direct current path is completed at the termination of ring conductor 12 to ground via a resistor 22 and winding 17*b*. An alternating current path is provided by the connection of a capacitor 23 between the ends of windings 17*a* and 17*b*.

The transformer 16 is conveniently characterized by a split core of the "E-I" type as previously mentioned to provide an air gap to prevent saturation at relatively high currents. In accordance with this invention, a magnetoresistive device 25 is inserted in this air gap which device 25 is serially connected in a detection circuit including a threshold transistor 26. The device 25 may advantageously comprise a magnetoresistor element of the character described in the afore-cited EDN/EEE article; as there described, such elements are semiconductors which present resistance in a circuit in the presence of a magnetic field applied to the semiconductor, which resistance varies directly as the magnetic field varies. Transistor 26 has its base-emitter circuit connected between a source of positive potential 27 via a resistor 28 and ground and has its collector connected to a scanning arrangement multipled to other subscriber lines of the telephone system not shown in the drawing. A simplified representative scanning circuit as shown in FIG. 1 may typically comprise a two-input NAND logic gate 30 associated with each subscriber line, the gate 30 having a single output terminal 31 on which output signals indicating the operational state of subscriber line circuit 10 are made available. The gate 30, one input of which is connected to the collector output of transistor 26, is periodically enabled by an enabling pulse applied to its other input from a scan pulse source 32. The source 32 may comprise any circuitry well known in the art and found in present day electronic switching systems capable of providing pulses of the character and at the times to be hereinafter considered. Accordingly, source 32 is described here only in terms of its function.

With the foregoing description of the organization of one specific supervisory arrangement according to this invention in mind, an illustrative operation may now be considered. When the hookswitch contacts 14 at subscriber station 13 are closed with the removal of the handset from its cradle, a direct current circuit is completed from potential source 20 which may be traced to ground as follows via resistors 21, winding 17*a*, tip conductor 11, hookswitch contacts 14, now closed, normally closed dial contacts 15, ring conductor 12, winding 17*b*, and resistor 22. The current now present in the latter circuit generates by its windings 17*a* and 17*b* a magnetic flux in the split core of transformer 16 which flux passes through the air gap and is thereby applied to magnetoresistor 25. The latter element is serially connected in a circuit including positive potential source 27 and load resistor 28 to which latter resistor the base of transistor 26 is also connected. An effective voltage divider is thus formed, an output tap *t* of which supplies a bias voltage to the transistor base input. Normally with no current present in subscriber line circuit 10, no flux is applied to magnetoresistor 25 and current in the detection circuit is measured by the fixed value of resistor 28 and the resistance of quiescent magnetoresistor 25. The value of resistor 28 is determined so that the bias voltage available under these conditions is insufficient to drive transistor 26 to its conducting state. With the closure of hookswitch contacts 14 and the resulting flux in the air gap of transformer 16, however, the resistance of magnetoresistor 25 increases until a voltage level is reached at tap *t* sufficient to bias transistor 26 to its conducting state. With transistor 26 conducting, current is drawn from a source typically incorporated in the circuitry of NAND logic gate 30 via the collector of transistor 26 and its emitter to ground. One input of the latter gate is thus activated in preparation for the next successive scanning of gate 30 by an enabling pulse from the source 32. This pulse is assumed as negative-going to correspond with the negative-going input applied from the collector of transistor 26, NAND gate 30 being assumed as organized to generate a binary "1" output when either but not both of its inputs is high and a binary "0" output on terminal 31 when both inputs are low, or negative-going. Since in the present case, both inputs are low, a binary "1" output is generated on terminal 31 indicative of the fact that subscriber station 13 is off-hook and requesting service (or is busy). This output will be maintained as long as the hookswitch contacts 14 are closed during the duration of the call. When subscriber station 13 goes "on-hook" (or dial contacts 15 are periodically opened during the dialing of a called directory number), the resistance of magnetoresistor 25 returns to its quiescent value upon the termination of the flux in the air gap of transformer 16. The bias at tap point $t$ falls below the level necessary to maintain transistor 26 conductive and the collector-connected input of gate 30 rises to its normal, high level. As a result, since one of the inputs of gate 30 is now high during a periodic scan, the output supplied to terminal 31 is a binary "1" indicating that subscriber station 13 is idle (or that a "break" interval appears in the digital generation of the dial pulses at contacts 15). The outputs indicative of the operational state of subscriber station 13 as thus appearing at terminal 31 are in accord with conventional practice and are employed by the control circuitry of the telephone system with which this invention may be adapted for use to establish the requested connections as signaled from station 13.

Figure 2:
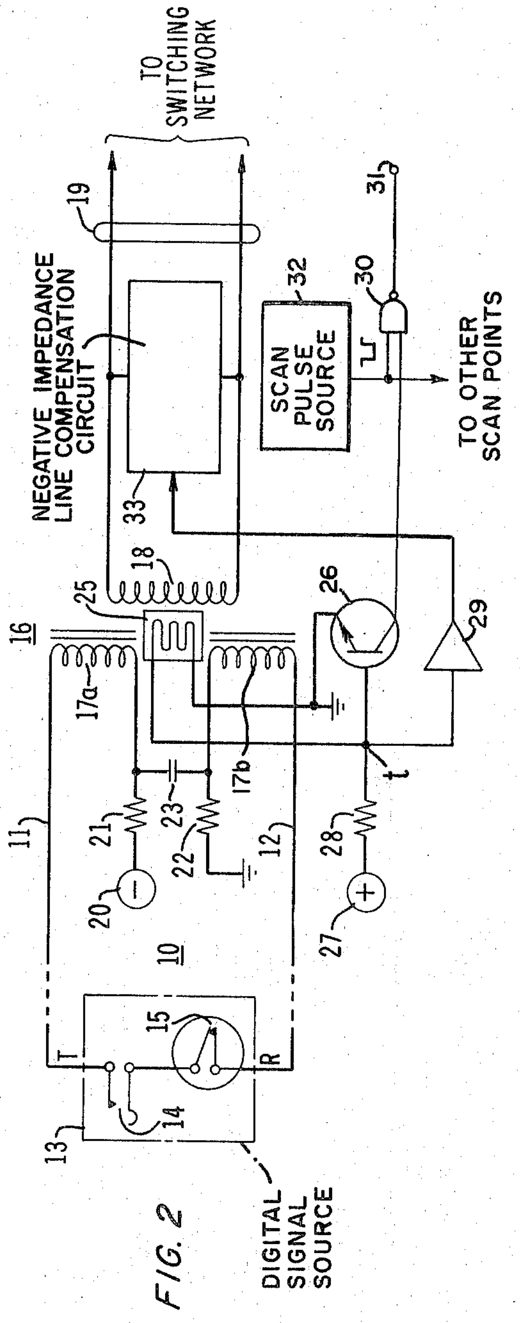
FIG. 2 depicts, also schematically, another illustrative supervisory circuit according to this invention combining the output circuitry of the embodiment of FIG. 1 with additional output circuitry adapted to provide an analog indication of the length of a telephone or other communications line loop and to compensate for variations in such lengths, identical circuit components being designated in the figures by the same reference characters.

In the embodiment of FIG. 1 described in the foregoing, the response to the varying resistance of magnetoresistor 25 was digital: transistor 26 is essentially a threshold device which was either conductive or nonconductive as determined by the resistance level of element 25. The illustrative embodiment of FIG. 2, to which we may now turn, incorporates all of the circuit details of the embodiment of FIG. 1 and further includes a detection circuit which responds in an analog fashion to the same signaling conditions as those of the circuit of FIG. 1 to control a subscriber line compensating arrangement. Since the circuits of FIGS. 1 and 2 are identical in organizational detail and function to a point, the same reference characters are employed where applicable to designate identical circuit elements. It will also be unnecessary to repeat in connection with the arrangement of FIG. 2, a description of circuit elements the details of which may be ascertained by reference to the description of the embodiment of FIG. 1. In the embodiment of FIG. 2, the voltage divider tap $t$ also provides an input to a linear amplifier 29 of a well-known type, the output of which in turn is connected to a line compensation circuit 33 bridging the transmission conductor pair 19. The circuit 33 may comprise any negative impedance circuit, for example, well known in the art, which is capable of compensating for the loss presented by a line circuit 10 in direct relationship to the value of the current present in the circuit 10 upon its going "off-hook." The latter current again generates a proportional flux through the air gap of the core of transformer 16 to control the resistance of magnetoresistor 25 as previously described. As the latter resistance varies, the voltage at tap point $t$ also varies to control the output of amplifier 29. The latter output operates in turn to control the degree of compensation introduced into transmission path 19 by compensation circuit 33.

The supervisory arrangements depicted in FIGS. 1 and 2 as representative of the application of the principles of this invention are there assumed for purposes of description as independent entities. It will be appreciated, on the other hand, that since the separate embodiments may be identical in circuit detail to the voltage divider tap point $t$, the two embodiments are advantageously combinable in a single, dual function supervisory arrangement. Thus, for example, both transistor 26 and amplifier 29 may be controlled by potentials appearing at tap point $t$ and both the digital service function and the analog loss compensating function could be provided for the same line circuit 10. This is readily apparent from the circuit interconnections shown in the drawing.

Versatile yet simple supervisory circuits have been described in the foregoing in the illustrative context of a telephone subscriber line. It is to be understood, however, that this invention is not to be limited to the representative arrangements shown and described and that various and numerous other arrangements may be devised by one skilled in the art without departing from the spirit and scope of the invention as defined by the appended claims.

What is claimed is:

1. In a communication system, in combination, a subscriber line loop, a transformer having a primary winding means defining a dc path in said loop and a secondary winding, a transmission line including said secondary winding, said transformer having a core presenting an air gap, means for detecting direct current in said loop comprising a detection circuit including a current source and magnetoresistor means controlled responsive to a magnetic field applied thereto in said air gap for controlling the magnitude of said direct current in said detection circuit, output circuit means for generating an analog signal indicative of the magnitude of said current in said detection circuit, and compensating circuit means connected across said transmission line operated responsive to said analog signal for compensating for loss introduced in said line loop.

2. A telephone subscriber line loss compensation circuit comprising a transformer having primary winding means defining a dc path in said line at one end and having secondary winding means connected across the conductors of a transmission line, said transformer having a core presenting an air gap therein adapted to have a magnetic field generated thereacross of a magnitude as determined by the magnitude of current in said line, detection circuit means including a current source, magnetoresistor means located in said air gap operated responsive to said field to control the magnitude of current in said detection circuit means, and output circuit means for generating an analog signal indicative of the magnitude of said last-mentioned current, and compensating circuit means connected across said transmission line operated responsive to said analog signal.

3. A telephone subscriber line loss compensating circuit as claimed in claim 2 in which said compensating circuit means comprises a negative impedance circuit.

4. A telephone subscriber line circuit arrangement comprising a transformer having primary winding means defining a dc and an ac path in said line at one end and having secondary winding means connected across the conductors of a transmission line, said transformer having a core presenting an air gap therein adapted to have a magnetic field generated thereacross of a magnitude as determined by the magnitude of current in said line, detection circuit means including a current source and magnetoresistor means located in said air gap operated responsive to said field to control the magnitude of current in said detection circuit means, first output circuit means for generating a digital signal responsive to current of a predetermined magnitude in said detection circuit means indicative of the operative state of said line, second output circuit means for generating an analog signal indicative of the magnitude of said current in said detection circuit means, and loss compensation circuit means connected across said transmission line operated responsive to said analog signal for compensating for loss introduced in said subscriber line.

* * * * *